(12) United States Patent
Umbach

(10) Patent No.: US 7,442,300 B2
(45) Date of Patent: Oct. 28, 2008

(54) FILTER INSTALLATION FOR LIQUIDS

(75) Inventor: Christoph Umbach, Werther (DE)

(73) Assignee: Schröder Maschinenbau KG, Werther (DE)

( * ) Notice: Subject to any disclaimer, the term of this patent is extended or adjusted under 35 U.S.C. 154(b) by 518 days.

(21) Appl. No.: 11/044,808

(22) Filed: Jan. 27, 2005

(65) Prior Publication Data

US 2005/0161385 A1   Jul. 28, 2005

(30) Foreign Application Priority Data

Jan. 28, 2004   (DE) .................. 10 2004 004 120

(51) Int. Cl.
*B01D 35/027* (2006.01)
*B01D 35/153* (2006.01)
*B01D 35/12* (2006.01)

(52) U.S. Cl. ............... 210/232; 210/238; 210/172.3; 210/341; 210/418

(58) Field of Classification Search ............. 210/232, 210/238, 172.3, 341, 418
See application file for complete search history.

(56) References Cited

U.S. PATENT DOCUMENTS

| | | | |
|---|---|---|---|
| 679,940 A * | 8/1901 | Bromley | 137/236.1 |
| 1,072,371 A | 9/1913 | Stone | |
| 1,151,634 A * | 8/1915 | Watters | 210/391 |
| 1,327,708 A * | 1/1920 | Guy | 222/189.06 |
| 3,931,011 A * | 1/1976 | Richards et al. | 210/136 |
| 4,341,642 A * | 7/1982 | Koepke et al. | 210/767 |
| 5,770,065 A * | 6/1998 | Popoff et al. | 210/232 |
| 5,937,879 A * | 8/1999 | Payzant | 134/111 |
| 6,113,781 A * | 9/2000 | Popoff et al. | 210/234 |

FOREIGN PATENT DOCUMENTS

| | | |
|---|---|---|
| DE | 947 841 | 8/1956 |
| DE | 197 51 369 | 5/1999 |
| DE | 19751369 A1 * | 5/1999 |
| EP | 1 275 305 | 1/2003 |
| GB | 1 218 935 | 1/1971 |
| WO | WO 01/39859 | 6/2001 |

\* cited by examiner

*Primary Examiner*—Thomas M Lithgow
(74) *Attorney, Agent, or Firm*—Richard M. Goldberg

(57) ABSTRACT

Filter installation for liquids, including a basin with at least one closable suction opening, and a filter, which has a filter element and, from a removal position above the liquid can be lowered in a straight line to an operating position assigned to the suction opening. The suction opening, in an operating position of the filter, communicates with an inner space of the filter and, is connected essentially only through the filter element with liquid outside of the filter. There is a sealing device, which, during the lowering of the filter, while an external side of the filter is in contact with the liquid in the basin, seals the inner space of the filter from the liquid in the basin, so that the inner space of the filter is connected essentially only through the filter element with the liquid outside of the filter.

15 Claims, 2 Drawing Sheets

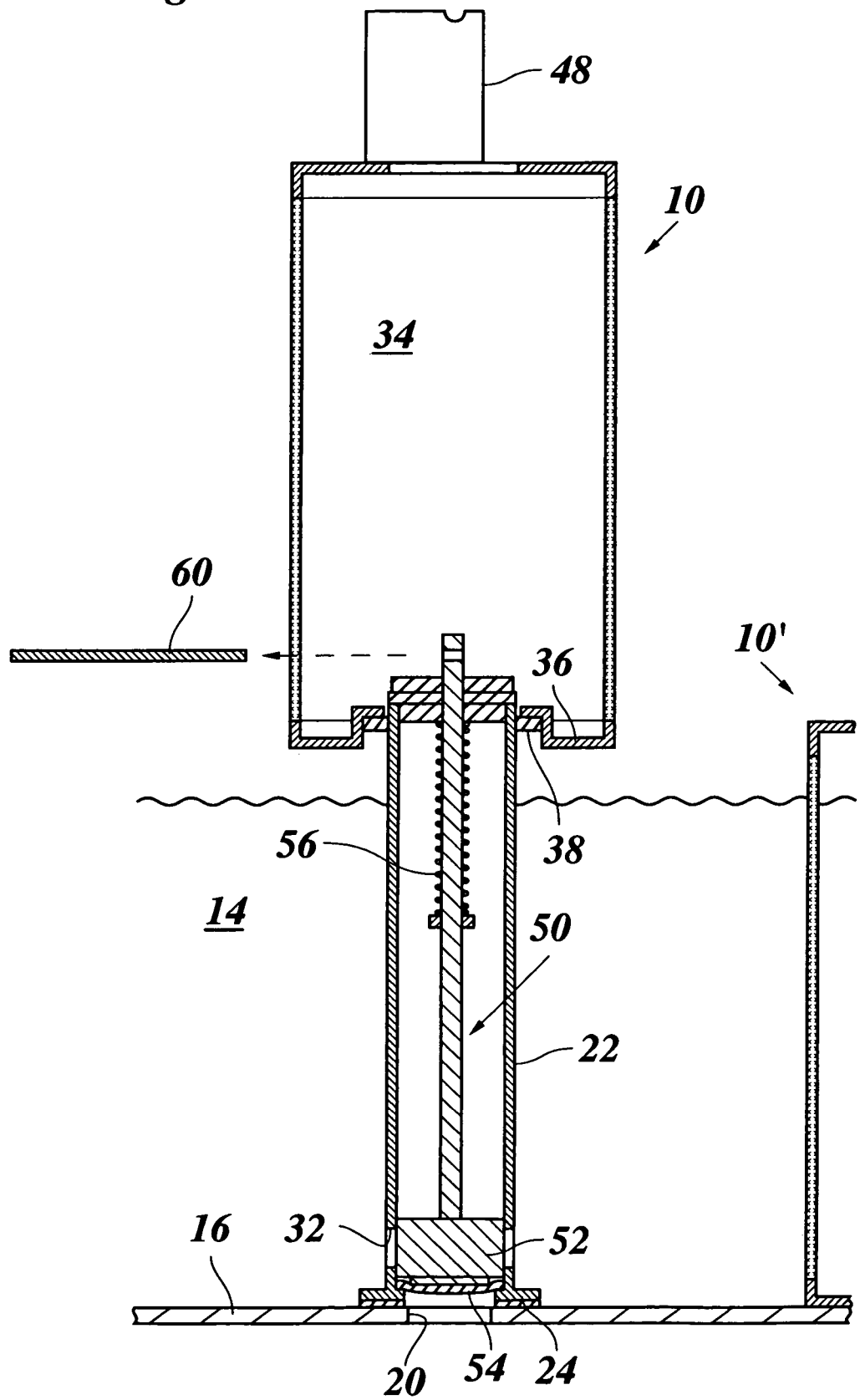

FILTER INSTALLATION FOR LIQUIDS

The invention relates to a filter installation for liquids with the distinguishing features given in the introductory portion of claim 1.

BACKGROUND OF THE INVENTION

The filter installation may, for example, be one for brine, which is pumped from a reservoir basin through the filter over a suction opening and supplied to a pickling machine. Usually, brine, discharging from a pickling machine, is recycled to the reservoir basin over a coarse filter. In order to protect the brine pump and to prevent blockage of the injection needles of the pickling machine by particles or impurities introduced, it is necessary to subject the brine to a fine filtering process. For this purpose, a conventional filter installation has, for example, two flat filters, which are arranged parallel to one another and separate the main part of the reservoir basin from a smaller part of the basin, from which the brine is removed by suction. After some time, these flat filters become blocked by particles filtered by them from the brine and can be removed by hand and cleaned.

In order to simplify the process of exchanging filters, it is known from the European patent application EP 1 275 305 that two cylindrical filters may be provided, each of which can be swiveled from a horizontal operating position into a vertical removal position. In the horizontal operating position, the brine flows through the filter from the outside to the inside and is pumped away by the brine pump. However, the filter is surrounded over the greater part of its length by a protective pipe, which, together with the filter, is swiveled into the vertical removal position. In this position, the protective pipe protrudes over the surface of the liquid and separates the filter from the brine in the basin. In this position, the suction opening is blocked. The filter can now be pulled out in the upward direction and cleaned. In the meantime, the brine can be exhausted under vacuum through the second filter, which is still in its operating position.

However, when the filter, which is blocked from outside with filtered material, is pulled out of the protective pipe, material can fall into the pipe. After the cleaned filter is reinserted and, together with the particular pipe, is swiveled into the horizontal operating position, this material is already within the filter and would be sucked in by the brine pump. However, this should be avoided. Accordingly, the filters cannot be exchanged safely.

The large space required by said filter installation is a further disadvantage. The protective pipe, which must protrude over the liquid surface in the removal position, largely covers the filter in the operating position, so that, essentially, only the length of filter, still protruding above the protective pipe, is effective. This results in a large overall length of the filter, for which, furthermore, space must be available, so that it can be swiveled from the horizontal position into the vertical position.

It is an object of the invention to create a filter installation for liquids, which enables filters to be exchanged safely and, furthermore, requires less space.

SUMMARY OF THE INVENTION

Pursuant to the invention, this objective is accomplished with a filter installation of the type named above owing to the fact that the filter installation has a sealing device, which, while the filter is being lowered and an external side of the filter is in contact with the liquid in the basin, keeps the inner space of the filter sealed from the liquid in the basin in such a manner, that the inner space of the filter is connected essentially only over the filter element with liquid outside of the filter.

It is an advantage of this filter installation that less space is required, since an upright filter, which may, for example, be cylindrical, can be removed in a straight line in the upward direction. It is a further advantage that a protective pipe outside of the filter is not required. The full height of the part of the filter below the surface of the liquid can accordingly be used for filtering. It is a further, important advantage that the filter, removed with the suction opening closed, is sealed by the sealing device from the liquid in the basin during the reinsertion. Filtered material can therefore not reach the interior of the filter accidentally. Rather, when the filter is lowered, the inner space of the filter is filled in that the liquid passes through the filter element.

Advantageous developments of the invention arise out of the dependent claims.

Preferably, the suction opening is disposed at a rod-shaped element, which is connected with the bottom and protrudes upward above the surface of the liquid and the filter has an opening at the bottom for the rod-shaped element. When the filter is lowered, the opening is sealed from the rod-shaped element by the sealing device. As the filter is lowered, it is pushed onto the rod-shaped element. In the operating position of the filter, the rod-shaped element rises up into the inner space of the filter. The suction opening, disposed at the rod-shaped element, is now in the inner space of the filter. As the filter is lowered, unfiltered liquid is prevented from reaching the inner space of the filter because a seal is formed by the sealing device between the opening at the bottom of the filter and the rod-shaped element. Accordingly, the rod-shaped element enables the filter to be shifted into its operating position particularly simply and safely.

Preferably, openings, which can be closed off, are disposed in the wall of the rod-shaped element. At the inside, they are connected with the suction opening. Since the openings are closed off before a change of filters, the suction opening is protected against entry of unfiltered material.

In a preferred embodiment, the rod-shaped element is a pipe, in which a slide valve is disposed, with which the openings and the suction opening can be closed off simultaneously. As a result, the operation is particularly simple. For cleaning purposes, the slide valve can be removed. This permits the slide valve, as well as the pipe to be cleaned particularly thoroughly and simply.

Preferably, the slide valve is held in the closed position by the force of a spring and has a supporting element, which supports it in its open position on the filter, which is in the operating position. The spring enables the openings and the suction opening to be closed off securely while the filter is being exchanged. The supporting element prevents any unintentional closing during the operation of the filter and can, moreover, transfer the force of the spring to the filter, so that the latter is held firmly.

Preferably, the upper end of the pipe has guiding contours, at which a lid can be locked in the form of a bayonet lock. The lid serves to seal the pipe. However, it can also support the spring, which produces the above-mentioned force. It is furthermore advantageous that any given wall thickness of the pipe is sufficient for forming the guiding contours. In the case of a pipe with a circular cross-section, the lid can be configured in such a manner, that it does not exceed the external diameter of the pipe. By these means, when the filter is lowered, the sealing device can be shifted without hindrance along the external wall of the pipe. In the interior of the pipe, the slide valve, even if it takes up the whole of the internal diameter of the pipe, can nevertheless be removed in the upward direction for cleaning purposes.

In a particularly preferred embodiment, the basin has at least two suction openings, which can be closed off independently of one another. Each of the suction openings is provided with a filter and the filters can be moved independently of one another from the operating position into the removing position. In this way, a suction operation can be provided continuously and the filters can be exchanged consecutively or alternatively, if required.

BRIEF DESCRIPTION OF THE DRAWINGS

In the following, an example of the invention is explained in greater detail by means of the drawing in which FIG. 1 shows a portion of a filter installation with a filter in its operating position and FIG. 2 shows part of the filter installation with the filter in its removal position.

DETAILED DESCRIPTION

Figure 1:
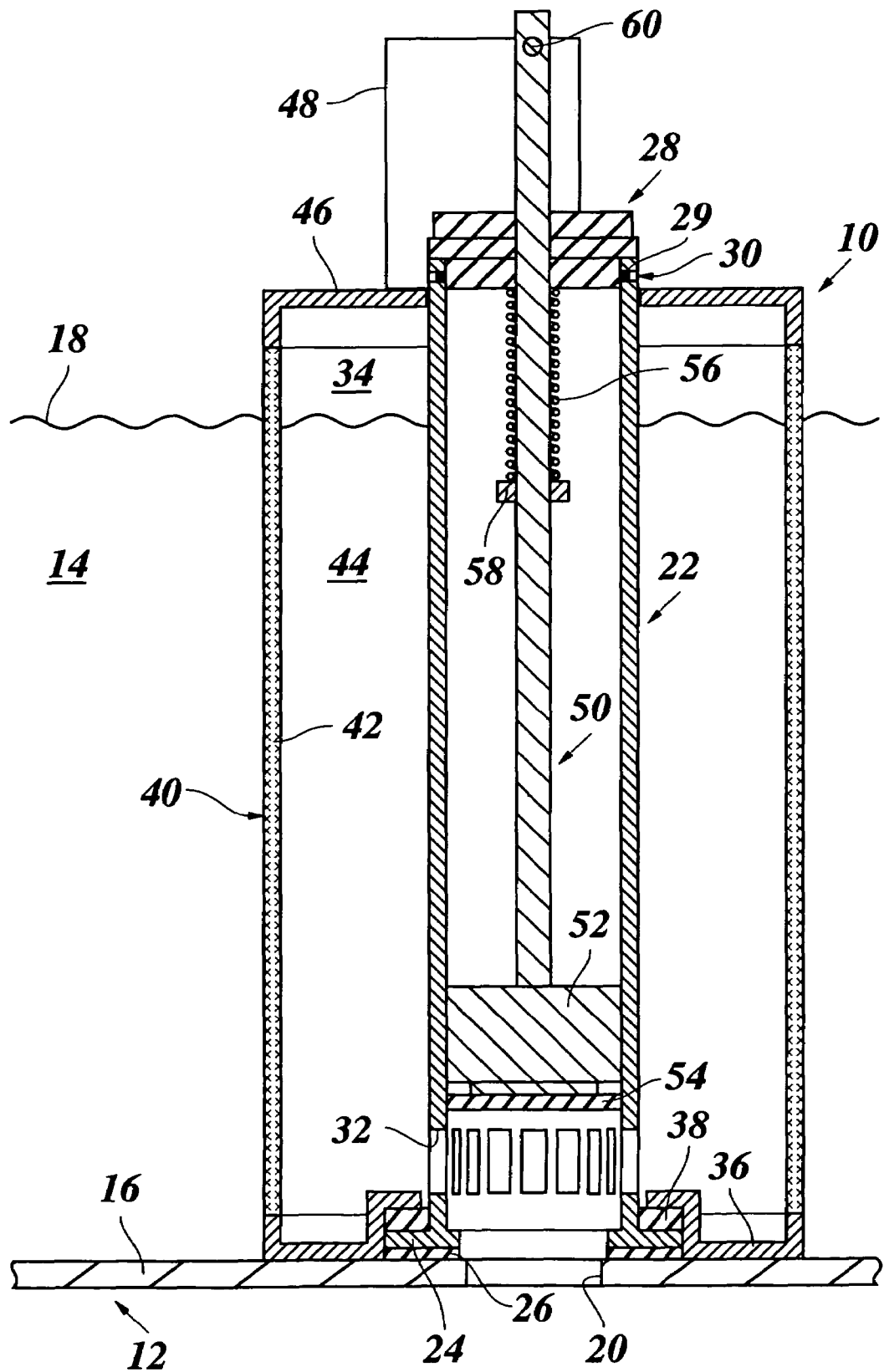

FIG. 1 shows a filter 10, which dips into a liquid 14 in a basin 12. The filter 10 consists, for example, of metal. It is part of a filter installation, to which a further, similar filter 10' (FIG. 2) which is disposed in a basin 12 next to the filter 10, belongs. Only a bottom 16 of the basin 12 is shown. The basin 12 is filled with the liquid 14 up to the liquid surface 18. The liquid 14 contains, for example, particles, which are to be retained by the filter 10, while the liquid is aspirated through a suction opening 20 in the bottom 16 of the basin. The pipeline, which is connected to the suction opening 20, and the pump are constructed in the usual manner.

At the bottom of the basin 12, a cylindrical standpipe 22 with a foot 24 is anchored around the suction opening 20 and sealed by a sealing device 26 at the bottom. It may, for example, be bolted to the bottom 16.

The standpipe 22 protrudes above the liquid surface 18 and is covered by a lid 28. The lid 28 has catches 29, with which it engages guiding contours 30 of the standpipe 22. The catches 29 and the guiding contours 30 form a simple bayonet lock, with which the lid 28 is fastened to the standpipe. The standpipe 22 is provided with lateral openings 32, which are connected over the standpipe with the suction opening 20. Alternatively, only one opening may also be provided.

The filter 10 encloses an inner space 34, in which the standpipe 22 is located. At its bottom 36, the filter 10 has an annular seal 38, which encloses the standpipe 22 tightly, and forms a seal between the bottom 36 of the filter 10 and the standpipe. The filter 10 is in its operating position in FIG. 1. Its external side 40 is in contact with the liquid 14. Any particles, impurities or other parts, contained in the liquid, are filtered by a filter element 42, so that filtered liquid 44 collects in the inner space 34 of the filter 10. The filter element 42 is cylindrical and takes up the predominant part of the exterior wall of the filter 10. The filtered liquid 44 passes through the openings 32 of the standpipe 22 and is pumped away through the suction opening 20.

Since the filter element 42 forms the exterior wall of the filter 10, the filter element 42 has a comparatively large area for a given size of the filter.

In the operating position of the filter 10, the seal 38 also seals the bottom of the filter with respect to the foot 24 of the standpipe.

At its upper side, the filter 10 has a cover 46, which covers the inner space 34. A support 48, the function of which is explained below, is disposed at the cover 46.

A slide valve 50 with a closing element 52 for the openings 32 and a sealing lip 54 are disposed in the standpipe 22. A compression spring 56 is clamped between a ring 58, fastened to the slide valve 50, and the cover 28. The slide valve 50 can be shifted in the lid 28 and is supported against the pressure of the spring 56 with a supporting element in the form of a crossbar 60 at the support 48 and at a further support 48, which is in front of the plane of the drawing. By these means, the slide valve 50 is held in the open position shown in FIG. 1, in which the openings 32 are connected with the suction opening 20. In addition, the filter 10 is held by the pressure of the spring, transmitted by the crossbar 60, at the bottom of the basin 12.

FIG. 2 shows the filter installation of FIG. 1, in which the filter 10 is in its removal position. The further filter 10' is partially visible in the right edge of the Figure.

In FIG. 2, a depression can be seen in the support 48 for accommodating the crossbar 60. To remove the filter 10, the crossbar 60 is first of all raised slightly and, together with the slide valve of 50, rotated through 90°, so that the crossbar 60 can be lowered between the supports 48. During the lowering of the slide valve 50, the sealing lip 54 comes to lie against the foot 24 of the standpipe 22 and, by these means, seals the suction opening 20. At the same time, the closing element 52 closes the openings 32. This state can be seen in FIG. 2.

After the openings 32 and the suction opening 20 are closed, which is supported and assured by the action of the spring 56, the crossbar 60 can be removed from the slide valve 50, as indicated by an arrow drawn by a broken line. After that, the filter 10 can be pulled off in the upward direction. In the removal position shown in FIG. 2, it can be removed in the upward direction and then cleaned. During this time, the second filter 10' still is in its operating position so that liquid can continue to be exhausted. The uninterrupted operation of other parts of the machine, which depend on a continued supply of filtered liquid, can be ensured in this manner.

The cleaned filter 10 can then be brought back into the position shown in FIG. 2 and lowered along the standpipe 22. At the same time, the seal 38 seals the gap between the bottom 36 of the filter 10 and the standpipe 22, so that unfiltered liquid or other material cannot penetrate into the inner space 34 of the filter 10. After the filter 10 is lowered, the slide valve 50 can be raised by means of the crossbar 60 and the connection between the openings 32 and the suction opening can be restored, as shown in FIG. 1.

Together with the closing element 52 and the spring 56, the slide valve 50 can be pulled completely out of and removed from the standpipe 22 for cleaning purposes.

It is pointed out that the drawing is not to scale and that, in particular, the wall thickness of the standpipe 22 and, accordingly, the depth of the openings 32 are exaggerated for illustrative purposes.

The example shown is only an example of the inventive filter installation. The configuration of the filter 20 and, in particular, of the sealing device, with which the filter 10 is sealed when lowered into its operating position, can be varied at will. Accordingly, it is, for example, conceivable that a rectangular filter 10 with a closed bottom is used, which is lowered at a side wall of the basin 12 and has an opening, which faces this sidewall and is sealed with respect to the side wall while the filter is being lowered. In its operating position, this opening can then lie opposite to a suction opening in the wall of the basin 12, which can be closed off, for example, by a slide valve disposed in the wall. The filter once again may have a supporting element for the slide valve.

The invention claimed is:
1. Filter installation for liquids, comprising:
a basin with at least one suction opening which is adapted to be closed off,
a filter, which has a filter element and, from a removal position above the liquid, is adapted to be lowered in a straight line to an operating position assigned to the suction opening,
the suction opening, in the operating position of the filter, being in communication with an inner space of the filter and being connected essentially only through the filter element with liquid outside of the filter in the basin,
a sealing device, which, during the lowering of the filter, while an external side of the filter is in contact with the liquid in the basin, seals the inner space of the filter from the liquid in the basin, so that the inner space of the filter is connected essentially only through the filter element with the liquid outside of the filter,
a pipe disposed at the suction opening which is connected with the bottom of the basin and the pipe extending upward above a surface of the liquid,
an opening at a bottom of the filter to permit pushing of the filter onto the pipe, which opening is sealed with respect to the pipe by the sealing device while the filter is being lowered,
at least one opening, which can be closed off, disposed in a wall of the pipe element and in communication with the suction opening, and
a slide valve slidably disposed in the pipe, for closing off the at least one opening in the pipe and the suction opening at the same time, the slide valve comprising a sealing lip for sealing the suction opening.

2. The filter installation of claim 1, further comprising a spring for holding the slide valve in a closed position and a supporting element for supporting the slide valve in an open position of the latter, on the filter, which is in the operating position.

3. The filter installation of claim 1, wherein an upper end of the pipe has guiding contours in the form of a bayonet connection for locking a lid on the pipe.

4. The filter installation of claim 1, wherein the basin has at least two suction openings, which can be closed off independently of one another and each of which has a filter, the filters being movable independently of one another from the operating position into the removal position.

5. The filter installation of claim 1, wherein the filter installation is a filter installation for brine.

6. The filter installation of claim 1, wherein the slide valve is lowered towards the suction opening in a sliding direction for closing the suction opening, and the sealing lip contacts an inner circumferential lip at the suction opening during said movement in the sliding direction in order to seal the suction opening.

7. The filter installation of claim 6, wherein the sealing lip is provided at a lower end of the slide valve.

8. Filter installation for liquids, comprising:
a basin with at least one suction opening which is adapted to be closed off,
a filter, which has a filter element and, from a removal position above the liquid, is adapted to be lowered in a straight line to an operating position assigned to the suction opening,
the suction opening, in the operating position of the filter, being in communication with an inner space of the filter and being connected essentially only through the filter element with liquid outside of the filter in the basin,
a sealing device, which, during the lowering of the filter, while an external side of the filter is in contact with the liquid in the basin, seals the inner space of the filter from the liquid in the basin, so that the inner space of the filter is connected essentially only through the filter element with the liquid outside of the filter,
a pipe disposed at the suction opening which is connected with the bottom of the basin and the pipe extending upward above a surface of the liquid,
an opening at a bottom of the filter to permit pushing of the filter onto the pipe, which opening is sealed with respect to the pipe by the sealing device while the filter is being lowered,
at least one opening, which can be closed off, disposed in a wall of the pipe element and in communication with the suction opening, and
a slide valve slidably disposed in the pipe, for closing off the at least one opening in the pipe and the suction opening at the same time, the pipe being covered by a lid in both an operating position and in a removal position of the filter.

9. The filter installation of claim 8, wherein the filter installation is a filter installation for brine.

10. The filter installation of claim 8, wherein the slide valve is lowered towards the suction opening in a sliding direction for closing the suction opening, and the sealing lip contacts an inner circumferential lip at the suction opening during said movement in the sliding direction in order to seal the suction opening.

11. The filter installation of claim 10, wherein the sealing lip is provided at a lower end of the slide valve.

12. Filter installation for liquids, comprising:
a basin with at least one suction opening which is adapted to be closed off,
a filter, which has a filter element and, from a removal position above the liquid, is adapted to be lowered in a straight line to an operating position assigned to the suction opening,
the suction opening, in the operating position of the filter, being in communication with an inner space of the filter and being connected essentially only through the filter element with liquid outside of the filter in the basin,
a sealing device, which, during the lowering of the filter, while an external side of the filter is in contact with the liquid in the basin, seals the inner space of the filter from the liquid in the basin, so that the inner space of the filter is connected essentially only through the filter element with the liquid outside of the filter,
a pipe disposed at the suction opening which is connected with the bottom of the basin and the pipe extending upward above a surface of the liquid,
an opening at a bottom of the filter to permit pushing of the filter onto the pipe, which opening is sealed with respect to the pipe by the sealing device while the filter is being lowered,
at least one opening, which can be closed off, disposed in a wall of the pipe element and in communication with the suction opening, and
a slide valve slidably disposed in the pipe, for closing off the at least one opening in the pipe and the suction opening at the same time, the pipe being covered by a lid in both an operating position and in a removal position of the filter and the slide valve comprises a sealing lip for sealing the suction opening.

13. The filter installation of claim 12, wherein the filter installation is a filter installation for brine.

14. The filter installation of claim 12, wherein the slide valve is lowered towards the suction opening in a sliding direction for closing the suction opening, and the sealing lip contacts an inner circumferential lip at the suction opening during said movement in the sliding direction in order to seal the suction opening.

15. The filter installation of claim 14, wherein the sealing lip is provided at a lower end of the slide valve.

* * * * *